US009722495B2

(12) United States Patent
Zhang et al.

(10) Patent No.: US 9,722,495 B2
(45) Date of Patent: Aug. 1, 2017

(54) SYSTEMS AND METHODS FOR REAL-TIME SIGNAL SAMPLING IN POWER CONVERSION SYSTEMS

(71) Applicant: ON-BRIGHT ELECTRONICS (SHANGHAI) CO., LTD., Shanghai (CN)

(72) Inventors: Yunchao Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 2 days.

(21) Appl. No.: 13/784,489

(22) Filed: Mar. 4, 2013

(65) Prior Publication Data
US 2014/0241014 A1    Aug. 28, 2014

(30) Foreign Application Priority Data

Feb. 25, 2013    (CN) .......................... 2013 1 0058987

(51) Int. Cl.
*H02M 3/335*    (2006.01)
(52) U.S. Cl.
CPC ............................. *H02M 3/33507* (2013.01)
(58) Field of Classification Search
None
See application file for complete search history.

(56) References Cited

U.S. PATENT DOCUMENTS

| 4,947,171 A | 8/1990 | Pfeifer et al. |
| 5,877,802 A | 3/1999 | Takahashi et al. |
| 6,968,093 B1 * | 11/2005 | Boisvert et al. ............. 382/270 |

(Continued)

FOREIGN PATENT DOCUMENTS

| CN | 101707385 A | 5/2010 |
| CN | 101710785 A | 5/2010 |

(Continued)

OTHER PUBLICATIONS

Chinese Patent Office, Office Action mailed Apr. 17, 2015, in Application No. 201310058987.8.

(Continued)

*Primary Examiner* — Nguyen Tran
*Assistant Examiner* — Monica Mata
(74) *Attorney, Agent, or Firm* — Jones Day

(57) ABSTRACT

System and method for regulating a power conversion system. An example system controller includes a signal processing component and a driving component. The signal processing component is configured to receive a feedback signal associated with an output signal of a power conversion system and generate a processed signal based on at least information associated with the feedback signal. The driving component is configured to generate a drive signal based on at least information associated with the processed signal and output the drive signal to a switch in order to affect a primary current flowing through a primary winding, the drive signal being associated with a demagnetization period corresponding to a demagnetization process of the power conversion system. The signal processing component is further configured to, sample and hold the feedback signal a plurality of times during the demagnetization period to generate a plurality of sampled and held signals.

24 Claims, 11 Drawing Sheets

(56) References Cited

U.S. PATENT DOCUMENTS

| | | | |
|---|---|---|---|
| 2008/0089100 A1* | 4/2008 | Park | H02M 3/33523 363/21.01 |
| 2008/0180973 A1* | 7/2008 | Park | H02M 3/33523 363/21.01 |
| 2010/0194359 A1* | 8/2010 | Notman | H02M 3/1588 323/267 |
| 2011/0044076 A1* | 2/2011 | Zhang et al. | 363/21.17 |
| 2011/0062934 A1 | 3/2011 | Wolf et al. | |
| 2011/0157922 A1* | 6/2011 | Konecny | H02M 3/33515 363/21.12 |
| 2012/0075891 A1 | 3/2012 | Zhang et al. | |
| 2012/0195076 A1* | 8/2012 | Zhang et al. | 363/21.12 |
| 2013/0077354 A1* | 3/2013 | Behagel et al. | 363/21.01 |

FOREIGN PATENT DOCUMENTS

| | | | |
|---|---|---|---|
| CN | 101867299 A | 10/2010 | |
| CN | 101867299 B | 3/2012 | |
| CN | 102790531 A | 11/2012 | |
| EP | 0335988 A1 | 3/1988 | |

OTHER PUBLICATIONS

Chinese Patent Office, Office Action mailed Sep. 28, 2014, in Application No. 201310058987.8.
Taiwan Patent Office, Office Action mailed Oct. 6, 2014, in Application No. 102113647.
Chinese Patent Office, Office Action mailed May 5, 2015, in Application No. 201310058987.8.

* cited by examiner

SYSTEMS AND METHODS FOR REAL-TIME SIGNAL SAMPLING IN POWER CONVERSION SYSTEMS

1. CROSS-REFERENCES TO RELATED APPLICATIONS

This application claims priority to Chinese Patent Application No. 201310058987.8, filed Feb. 25, 2013, commonly assigned, incorporated by reference herein for all purposes.

2. BACKGROUND OF THE INVENTION

The present invention is directed to integrated circuits. More particularly, the invention provides a control system and method for signal sampling. Merely by way of example, the invention has been applied to real-time signal sampling in power conversion systems. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side. Then, some components, such as TL431 and an opto-coupler, can be omitted to reduce the system costs.

FIG. 1 is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a bipolar junction transistor. In another example, the power switch 120 is a MOS transistor.

To regulate the output voltage within a predetermined range, information related to the output voltage and the output loading often needs to be extracted. For example, when the power conversion system 100 operates in a discontinuous conduction mode (DCM), such information can be extracted through the auxiliary winding 114. When the power switch 120 is turned on, the energy is stored in the secondary winding 112. Then, when the power switch 120 is turned off, the stored energy is released to the output terminal, and the voltage of the auxiliary winding 114 maps the output voltage on the secondary side as shown below.

$$V_{FB} = \frac{R_2}{R_1 + R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1 + R_2} \quad \text{(Equation 2)}$$

FIG. 2 is a simplified diagram showing a conventional operation mechanism for the flyback power conversion system 100. As shown in FIG. 2, the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 114 is sampled at, for example, point A of FIG. 2. The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

FIG. 3 is a simplified diagram showing another conventional power conversion system with primary-side sensing and regulation. The power conversion system 200 includes a controller chip 202, a primary winding 210, a secondary winding 212, an auxiliary winding 214, a power switch 220, a current sensing resistor 230, an equivalent resistor 240 for an output cable, resistors 250 and 252, and a rectifying diode 260. The controller chip 202 includes a signal processing component 204, a demagnetization detector 206, an error amplifier 208, a reference-signal generator 248, an oscillator 228, a modulation component 218, a logic controller 224, an over-current-protection (OCP) component 226, and a driving component 222. The signal processing component 204 includes a sampling component 242, a switch 244, and a capacitor 246. The controller chip 202 includes terminals 282, 284, and 286. For example, the power switch 220 is a bipolar junction transistor. In another example, the power switch 220 is a MOS transistor.

The signal processing component 204 samples and holds a feedback signal 254 in response to a demagnetization-detection signal 256 from the demagnetization detector 206. The error amplifier 208 receives a sampled-and-held signal 258 from the signal processing component 204 and a reference signal 272 from the reference-signal generator 248, and outputs an amplified signal 262 to the modulation component 218. The modulation component 218 also receives a clock signal 264 from the oscillator 228 and a current-sensing signal 268 and outputs a modulation signal 266 to the logic controller 224. The driving component 222 outputs a drive signal 270 to the power switch 220 in order to regulate a primary current 272 flowing through the primary winding 210.

But errors can occur when the signal processing component 204 samples the feedback signal 254. Hence it is highly desirable to improve the techniques of primary-side sensing and regulation.

3. BRIEF SUMMARY OF THE INVENTION

The present invention is directed to integrated circuits. More particularly, the invention provides a control system and method for real-time signal sampling. Merely by way of example, the invention has been applied to power conversion systems. But it would be recognized that the invention has a much broader range of applicability.

According to one embodiment, a system controller for regulating a power conversion system includes a signal processing component and a driving component. The signal processing component is configured to receive a feedback signal associated with an output signal of a power conversion system and generate a first processed signal based on at least information associated with the feedback signal. The driving component is configured to generate a drive signal based on at least information associated with the first processed signal and output the drive signal to a switch in order to affect a primary current flowing through a primary winding, the drive signal being associated with a demagnetization period corresponding to a demagnetization process of the power conversion system. The signal processing component is further configured to, sample and hold the feedback signal a plurality of times during the demagnetization period to generate a plurality of sampled and held signals, select a signal from the plurality of sampled and held signals, hold the selected signal, and generate the first processed signal based on at least information associated the selected and held signal.

According to another embodiment, a signal processing device for regulating a power conversion system includes a sampling and holding component and a selection and holding component. The sampling and holding component is configured to sample and hold a feedback signal a plurality of times during a demagnetization period and generate a plurality of sampled and held signals based on at least information associated with the feedback signal, the feedback signal being associated with an output signal of a power conversion system, the demagnetization period corresponding to a demagnetization process of the power conversion system. The selection and holding component is configured to select a signal from the plurality of sampled and held signals, hold the selected signal, and output a first processed signal based on at least information associated with the selected and held signal for regulating the power conversion system.

In one embodiment, a method for regulating a power conversion system includes receiving a feedback signal associated with an output signal of a power conversion system, generating a processed signal based on at least information associated with the feedback signal, and generating a drive signal based on at least information associated with the processed signal. The method further includes outputting the drive signal to a switch in order to affect a primary current flowing through a primary winding, the drive signal being associated with a demagnetization period corresponding to a demagnetization process of the power conversion system. The process for generating a processed signal based on at least information associated with the feedback signal includes, sampling and holding the feedback signal a plurality of times during the demagnetization period to generate a plurality of sampled and held signals, selecting a signal from the plurality of sampled and held signals, holding the selected signal, and generating the processed signal based on at least information associated the selected and held signal.

In another embodiment, a method for regulating a power conversion system includes sampling and holding a feedback signal a plurality of times during a demagnetization period, the feedback signal being associated with an output signal of a power conversion system, the demagnetization period corresponding to a demagnetization process of the power conversion system, generating a plurality of sampled and held signals based on at least information associated with the feedback signal, and selecting a signal from the plurality of sampled and held signals. The method further includes holding the selected signal, and outputting a processed signal based on at least information associated with the selected and held signal for regulating the power conversion system.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides a control system and method for real-time signal sampling. Merely by way of example, the invention has been applied to power conversion systems. But it would be recognized that the invention has a much broader range of applicability.

Figure 1:
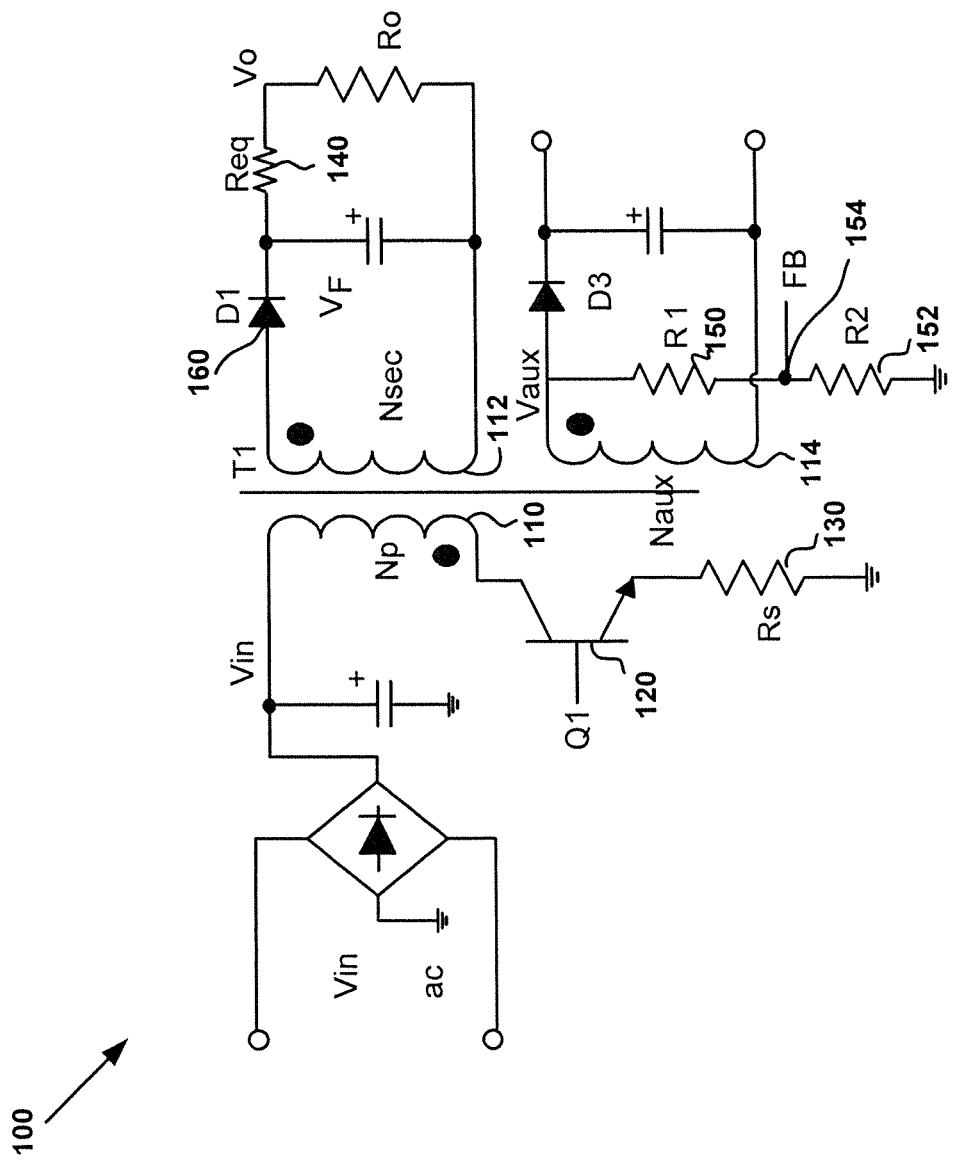
FIG. 1 is a simplified diagram showing a conventional flyback power conversion system with primary-side sensing and regulation.
Figure 2:
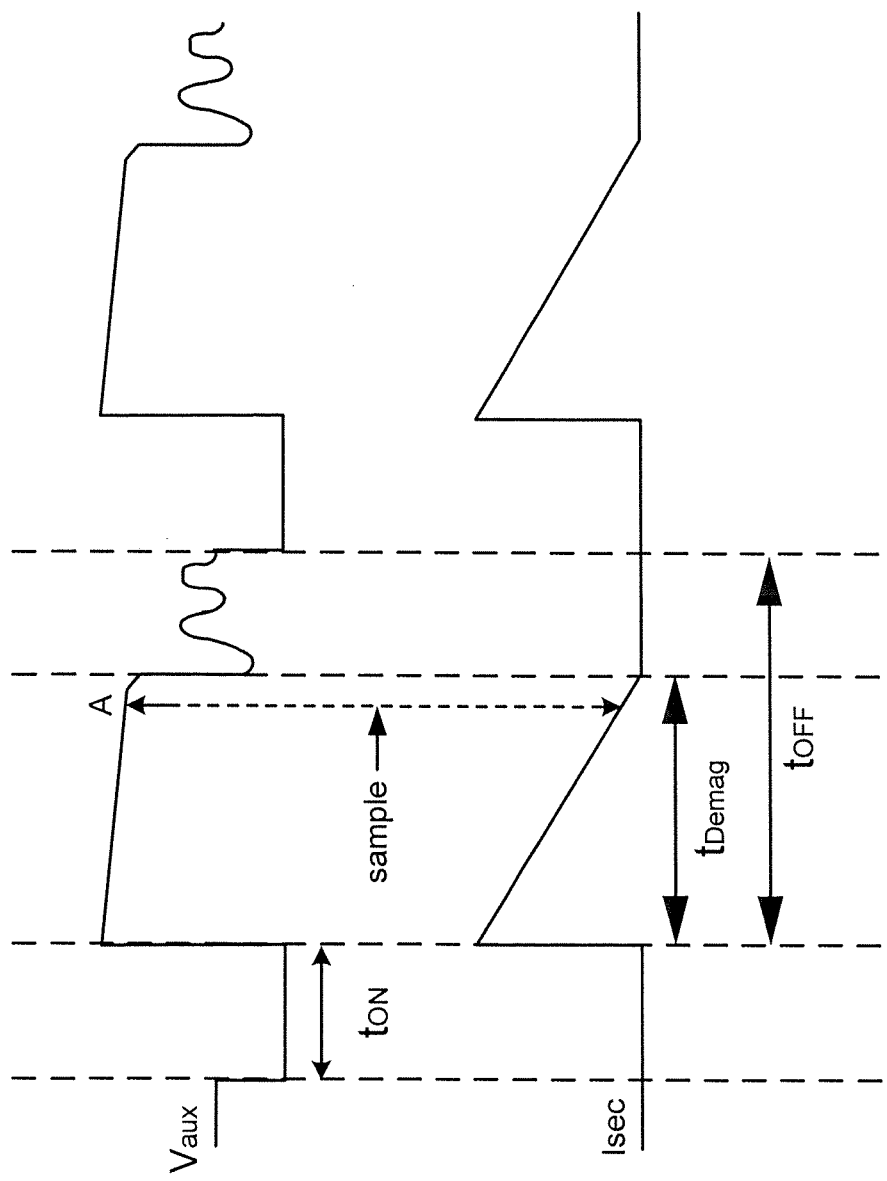
FIG. 2 is a simplified diagram showing a conventional operation mechanism for the flyback power conversion system as shown in FIG. 1.
Figure 3:
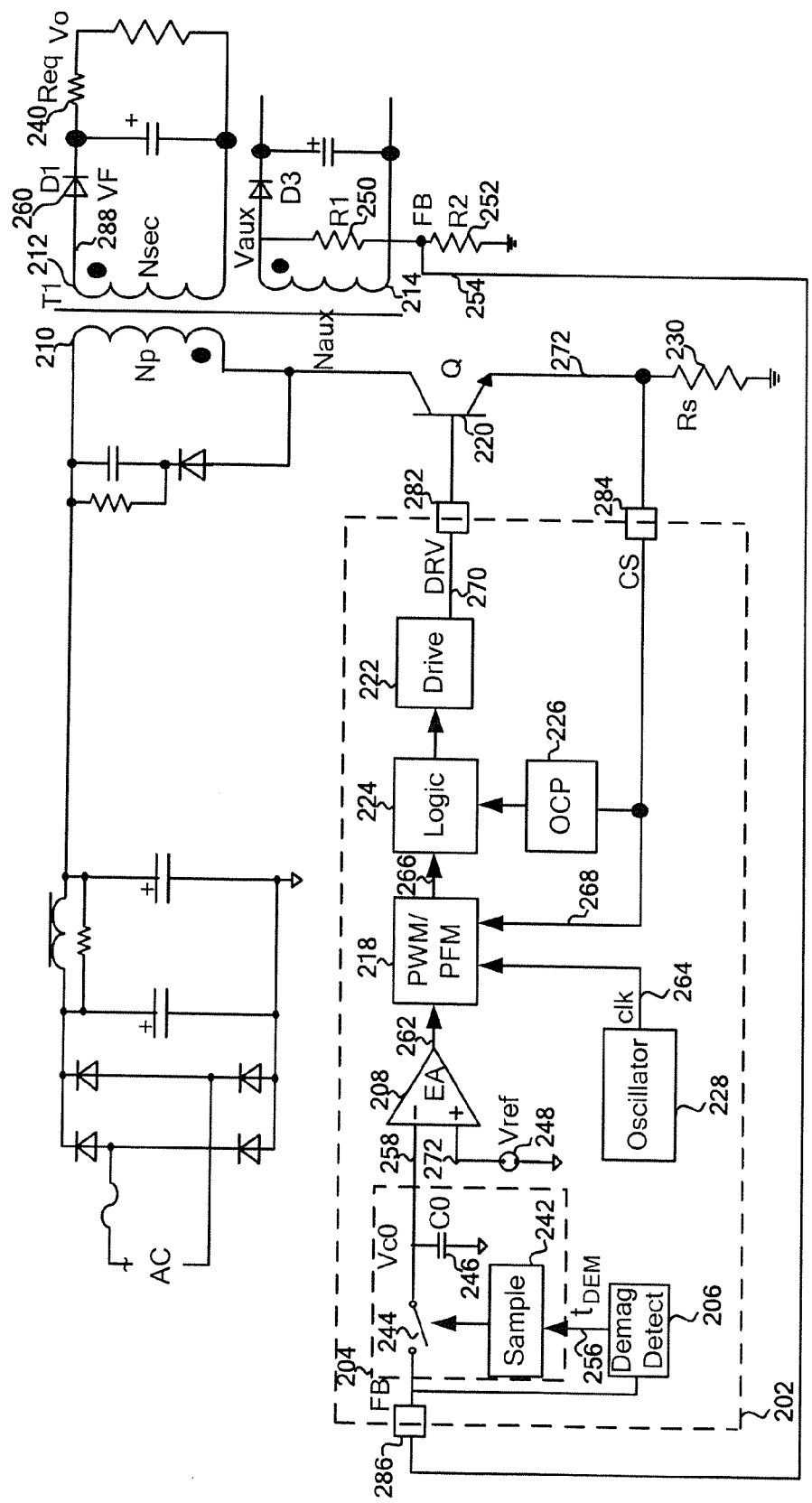
FIG. 3 is a simplified diagram showing another conventional power conversion system with primary-side sensing and regulation.
Figure 4:
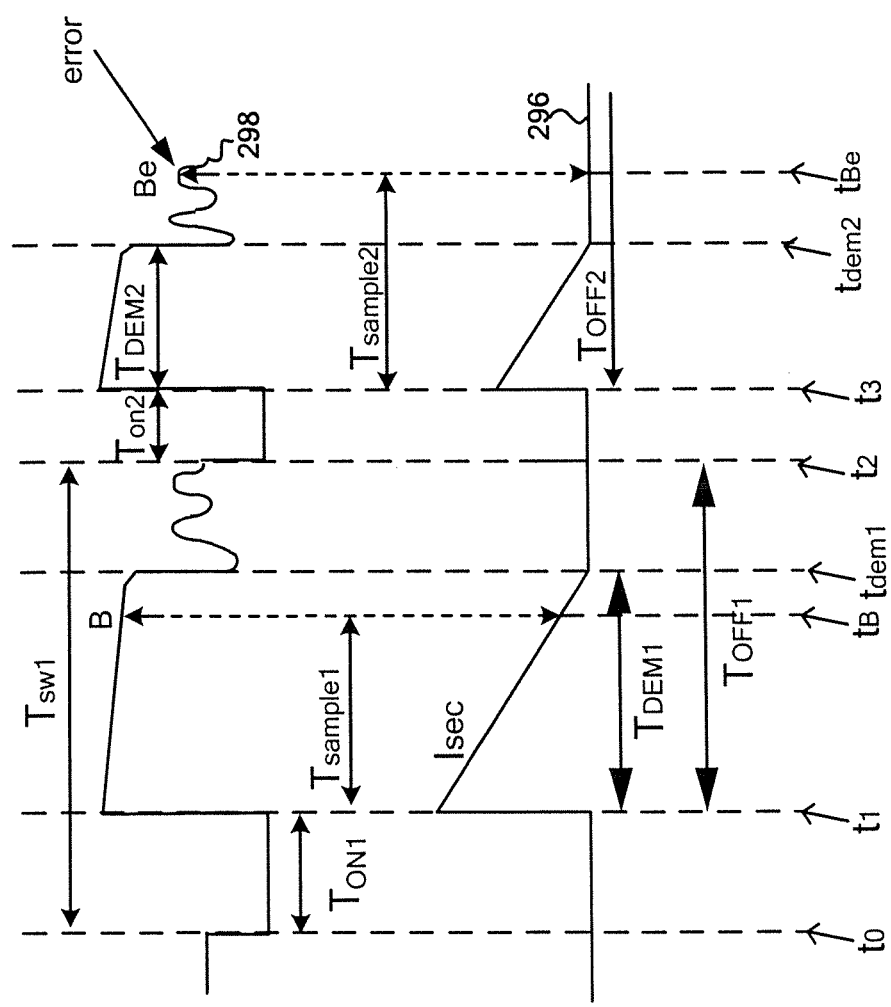
FIG. 4 is a simplified diagram showing certain specific error for the power conversion system as shown in FIG. 3 according to one embodiment.

FIG. 4 is a simplified diagram showing certain specific error for the power conversion system 200 according to one embodiment. The waveform 296 represents a secondary current 288 flowing through the secondary winding 212 as a function of time, and the waveform 298 represents the feedback signal 254 as a function of time. As shown in FIG. 4, a first switching period $T_{sw1}$ includes a first on-time period $T_{on1}$ and a first off-time period $T_{off1}$. The first on-time period starts at time $t_0$ and ends at time $t_1$, and the first off-time period $T_{off1}$ starts at the time $t_1$ and ends at time $t_2$. The first off-time period $T_{off1}$ includes a first demagnetization period $T_{DEM1}$ which starts at the time $t_1$ and ends at time $t_{dem1}$. A second on-time period $T_{on2}$ of a subsequent switching period starts at the time $t_2$ and ends at time $t_3$, and a second off-time period $T_{off2}$ of the subsequent switching period starts at the time $t_3$. The second off-time period $T_{off2}$ includes a second demagnetization period $T_{DEM2}$ which starts at the time $t_3$ and ends at time $t_{dem2}$.

During the switching period $T_{sw1}$, the signal processing component 204 samples the feedback signal 254 at point B which may be determined according to the duration of a demagnetization period in a preceding switching period. As shown in FIG. 4, the point B corresponds to time $t_B$, and the duration of a time period $T_{sample1}$ between the time $t_1$ and the time $t_B$ is equal to $2/3$ of the duration of the demagnetization period of the preceding switching period. Then, during the subsequent switching period, the signal processing component 204 samples the feedback signal 254 at point $B_e$ corresponding to time $t_{Be}$. The duration of a time period $T_{sample2}$ between $t_3$ and $t_{Be}$ is determined to be equal to $2/3$ of the duration of the demagnetization period $T_{DEM1}$. But because the demagnetization period $T_{DEM2}$ is much shorter in duration than the demagnetization period $T_{DEM1}$, the sampling point $B_e$ corresponding to the time $t_{Be}$ is out of the demagnetization period $T_{DEM2}$. Thus, errors occur when the signal processing component 204 samples the feedback signal 254 at point $B_e$, which may cause instability of the loop.

Figure 5:
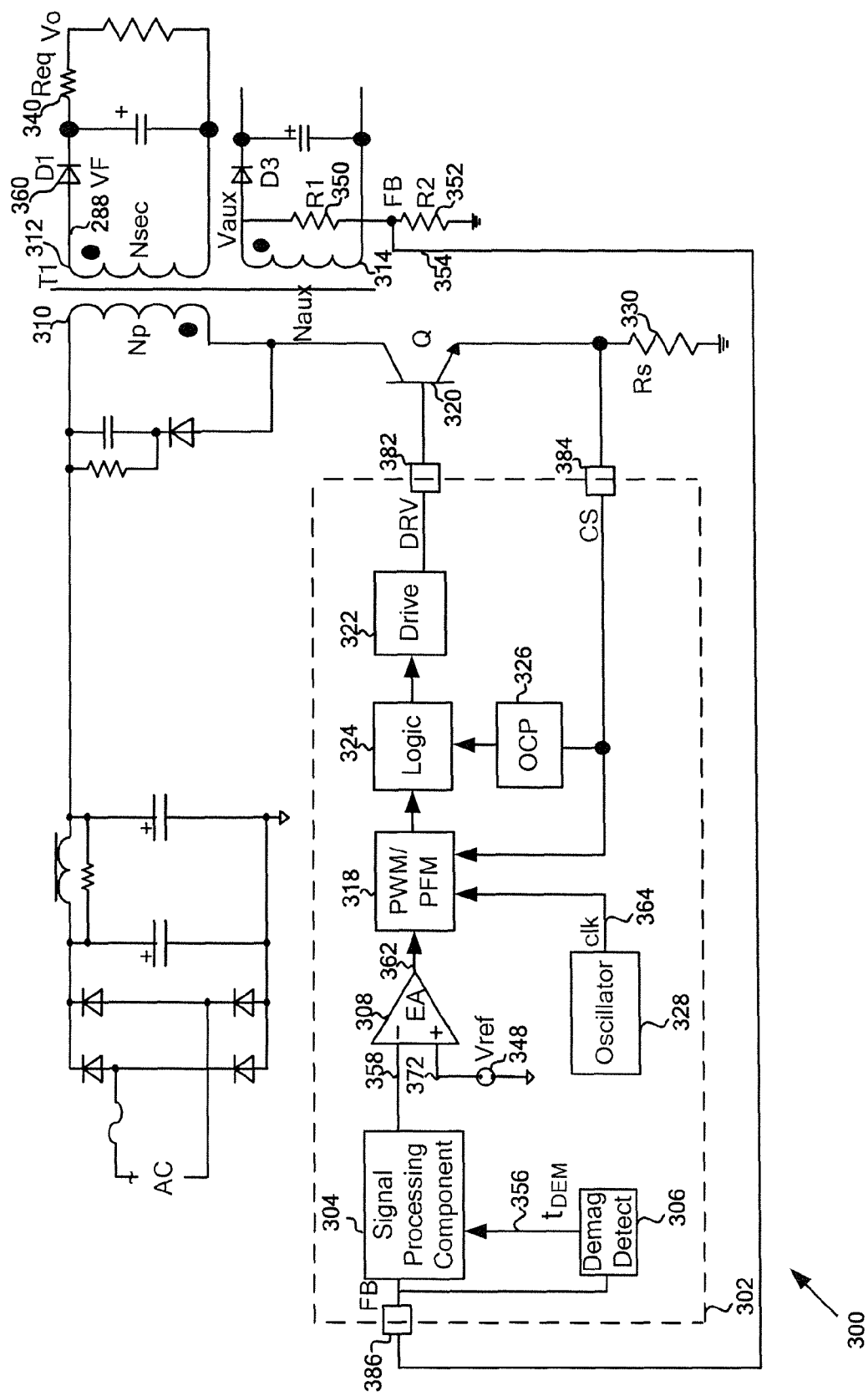
FIG. 5 is a simplified diagram showing a power conversion system with real-time signal sampling according to an embodiment of the present invention.

FIG. 5 is a simplified diagram showing a power conversion system with real-time signal sampling according to an embodiment of the present invention. This diagram is merely an example, which should not unduly limit the scope of the claims. One of ordinary skill in the art would recognize many variations, alternatives, and modifications. The power conversion system 300 includes a controller chip 302, a primary winding 310, a secondary winding 312, an auxiliary winding 314, a power switch 320, a current sensing resistor 330, an equivalent resistor 340 for an output cable, resistors 350 and 352, and a rectifying diode 360. The controller chip 302 includes a signal processing component 304, a demagnetization detector 306, an error amplifier 308, a reference-signal generator 348, an oscillator 328, a modulation component 318, a logic controller 324, an over-current-protection (OCP) component 326, and a driving component 322. The controller chip 302 includes terminals 382, 384, and 386. For example, the power switch 320 is a bipolar junction transistor. In another example, the power switch 320 is a MOS transistor.

According to one embodiment, the signal processing component 304 samples and holds a feedback signal 354 in response to a demagnetization-detection signal 356 from the demagnetization detector 306. For example, the error amplifier 308 receives a processed signal 358 from the signal processing component 304 and a reference signal 372 from the reference-signal generator 348, and outputs an amplified signal 362 to the modulation component 318. In another example, the modulation component 318 also receives a clock signal 364 from the oscillator 328 and a current-sensing signal 368 and outputs a modulation signal 366 to the logic controller 324. In yet another example, the driving component 322 outputs a drive signal 370 to the power switch 320 in order to regulate a primary current 372 flowing through the primary winding 310.

According to some embodiments, the signal processing component 304 performs real-time signal sampling. For example, the signal processing component 304 samples the feedback signal 354 based on information associated with a current switching period, instead of information of a preceding switching period. Thus, even if the duration of demagnetization periods varies in different switching periods, errors will not be introduced into sampling, in certain embodiments.

Figure 6:
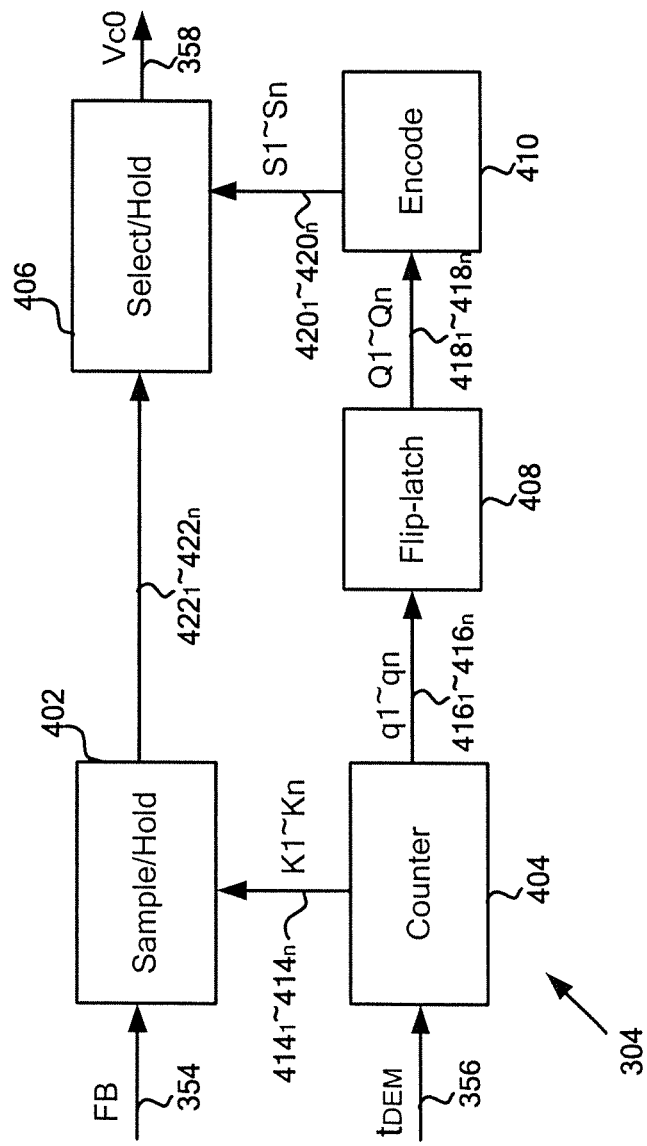
FIG. 6 is a simplified diagram showing the signal processing component as part of the power conversion system as shown in FIG. 5 according to an embodiment of the present invention.

FIG. 6 is a simplified diagram showing the signal processing component 304 as part of the power conversion system 300 according to an embodiment of the present invention. This diagram is merely an example, which should not unduly limit the scope of the claims. One of ordinary skill in the art would recognize many variations, alternatives, and modifications. The signal processing component 304 includes a sample-and-hold component 402, a select-and-hold component 406, a counter component 404, a flip-latch component 408, an encoding component 410, and a capacitor 412.

Figure 7:
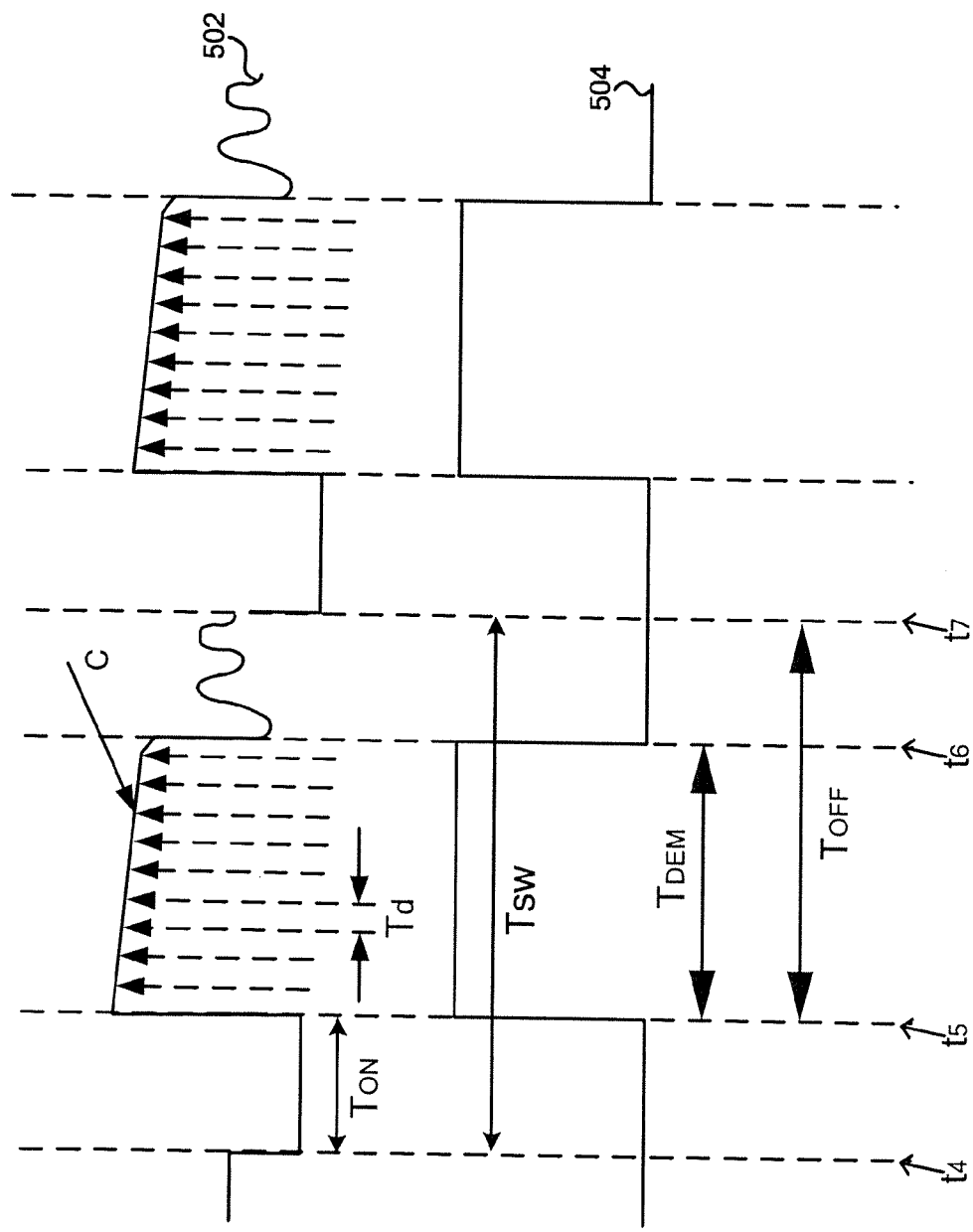
FIG. 7 is a simplified timing diagram for the power conversion system as shown in FIG. 5 according to an embodiment of the present invention.

FIG. 7 is a simplified timing diagram for the power conversion system 300 according to an embodiment of the present invention. This diagram is merely an example, which should not unduly limit the scope of the claims. One of ordinary skill in the art would recognize many variations, alternatives, and modifications. The waveform 502 represents the feedback signal 354 as a function of time, and the waveform 504 represents the demagnetization-detection signal 356 as a function of time. As shown in FIG. 5, a switching period $T_{sw}$ includes an on-time period $T_{on}$ and an off-time period $T_{off}$. The on-time period $T_{on}$ starts at time $t_4$ and ends at time $t_5$, and the off-time period $T_{off}$ starts at the time $t_5$ and ends at time $t_7$. The off-time period $T_{off}$ includes a demagnetization period $T_{DEM}$ which starts at the time $t_5$ and ends at time $t_6$.

As shown in FIG. 4 and FIG. 5, if the demagnetization-detection signal 356 indicates the demagnetization period $T_{DEM}$ begins (e.g., a rising edge in the demagnetization-detection signal 356 at $t_5$ as shown by the waveform 504), the counter component 404 is triggered, and generates multiple sampling signals $414_1$~$414_n$ (e.g., $K_1$~$K_n$, where n is an integer) during the demagnetization period $T_{DEM}$, in some embodiments. For example, the sample-and-hold component 402 samples the feedback signal 354 multiple times in response to the sampling signals $414_1$~$414_n$ and holds the sampled signals (e.g., onto one or more capacitors) until the end of the demagnetization period (e.g., at $t_6$). As shown by the waveform 502 in FIG. 5, during the demagnetization period $T_{DEM}$, the feedback signal 354 is sampled once for every sampling period (e.g., $T_d$), according to some embodiments.

In one embodiment, if the demagnetization-detection signal 356 indicates the demagnetization period ends (e.g., a falling edge in the demagnetization-detection signal 356 at $t_6$ as shown by the waveform 504), the flip-latch component 408 receives multiple signals $416_1$~$416_n$ (e.g., $q_1$~$q_n$, where n is an integer) from the counter component 404 and generates multiple signals $418_1 \sim 418_n$ (e.g., $Q_1 \sim Q_n$, where n is an integer). In yet another example, the encoding component 410 performs coding operations based on at least information associated with the signals $418_1 \sim 418_n$ and generates multiple selection signals $420_1 \sim 420_n$ (e.g., $S_1 \sim S_n$, where n is an integer). In yet another example, the select-and-hold component 406 selects and holds one of the signals $422_1 \sim 422_n$ (e.g., n is an integer) associated with the sampled signals from the sample-and-hold component 402 according to the selection signals $420_1 \sim 420_n$. The select-and-hold component 406 may select and hold one of the signals $422_1 \sim 422_n$ that is associated with a particular sampled signal (e.g., sampled at point C as shown in FIG. 7, two sampling periods before the end of the demagnetization period), in some embodiments. For example, the selected-and-held signal is then output as the processed signal 358. In yet another example, after a time period for sampling, the counter component 404 is reset (e.g., set to 0) until a next demagnetization period begins.

Figure 8:
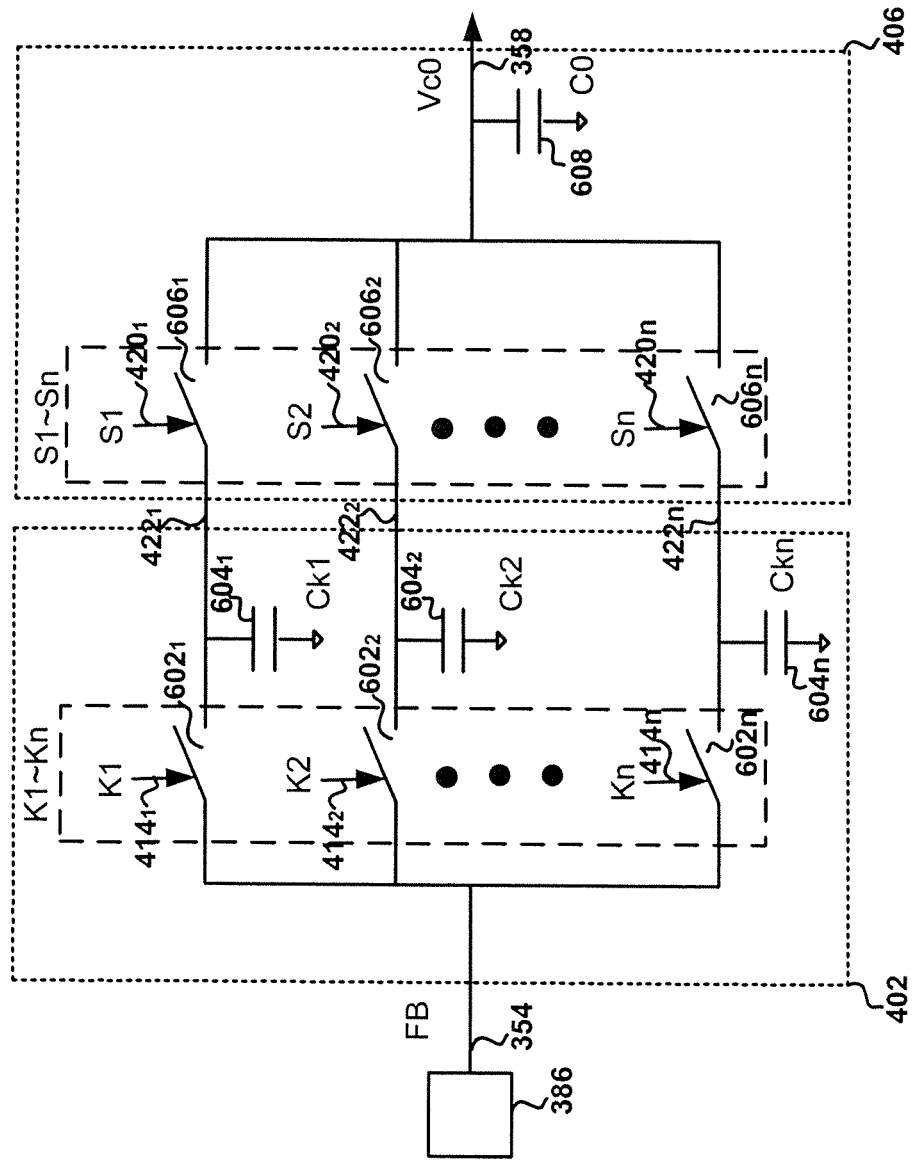
FIG. 8 is a simplified diagram showing the sample-and-hold component and the select-and-hold component as parts of the signal processing component as shown in FIG. 6 according to an embodiment of the present invention.

FIG. 8 is a simplified diagram showing the sample-and-hold component 402 and the select-and-hold component 406 as parts of the signal processing component 304 according to an embodiment of the present invention. This diagram is merely an example, which should not unduly limit the scope of the claims. One of ordinary skill in the art would recognize many variations, alternatives, and modifications. The sample-and-hold component 402 includes switches $602_1 \sim 602_n$ (e.g., n is an integer) and capacitors $604_1 \sim 604_n$ (e.g., n is an integer). The select-and-hold component 406 includes switches $606_1 \sim 606_n$ (e.g., n is an integer) and a capacitors 608.

According to one embodiment, referring back to FIG. 4 and FIG. 5, during the demagnetization period $T_{DEM}$, the feedback signal 354 is sampled once every sampling period (e.g., $T_d$), and the counter component 404 changes the sampling signals $414_1 \sim 414_n$ in response to each sampling of the feedback signal 354. For example, one of the switches $602_1 \sim 602_n$ is closed (e.g., being turned on) in response to each sampling, and the feedback signal 354 is sampled and held at one of the capacitors $604_1 \sim 604_n$ that corresponds to the closed switch. As the number of the switches $602_1 \sim 602_n$ and the capacitors $604_1 \sim 604_n$ is predetermined, the feedback signal 354 may be sampled and held in a circular manner if the number of sampled signals exceeds the number of the switches $602_1 \sim 602_n$, in some embodiments. For example, if the feedback signal 354 is sampled n+2 times during the demagnetization period, the first n sampled signals pass through the switches $602_1 \sim 602_n$ and are held at the capacitors $604_1 \sim 604_n$ respectively. The n+1 sampled signal and the n+2 sampled signal pass through the switches $602_1$ and $602_2$, and are held at the capacitors $604_1$ and $604_2$ respectively.

According to another embodiment, in response to the selection signals $420_1 \sim 420_n$ (e.g., $S_1 \sim S_n$, where n is an integer), one of the switches $606_1 \sim 606_n$ is closed (e.g., being turned on). For example, one of the signals $422_1 \sim 422_n$ from the sample-and-hold component 402 is selected to pass through the closed switch and is held at the capacitor 608 until the selected-and-held signal is output as the processed signal 358.

Figure 9:
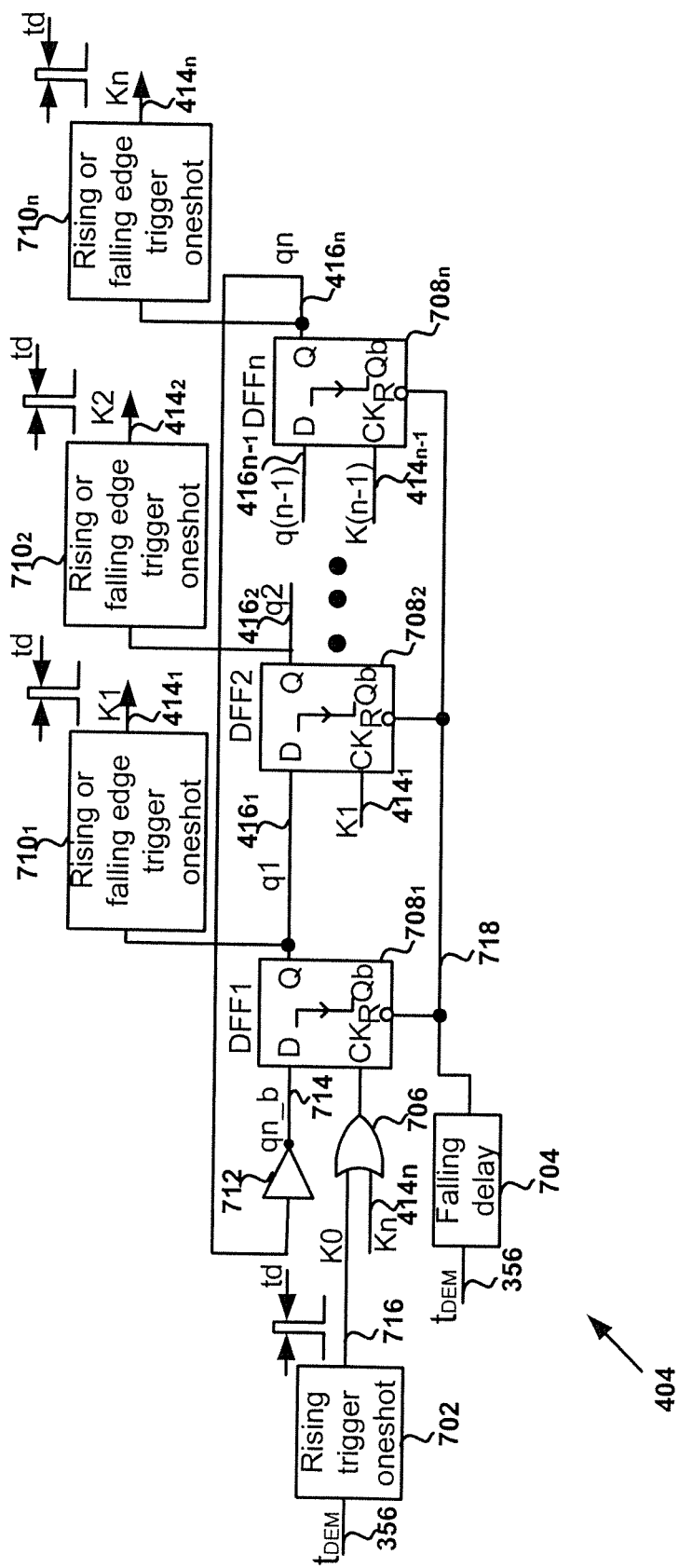
FIG. 9 is a simplified diagram showing the counter component as parts of the signal processing component as shown in FIG. 6 according to an embodiment of the present invention.

FIG. 9 is a simplified diagram showing the counter component 404 as parts of the signal processing component 304 according to an embodiment of the present invention. This diagram is merely an example, which should not unduly limit the scope of the claims. One of ordinary skill in the art would recognize many variations, alternatives, and modifications. The counter component 404 includes signal generators 702, 704, $710_1 \sim 710_n$ (e.g., n is an integer), flip-flop components $708_{1 \sim n}$ (e.g., n is an integer), a NOT gate 712, and an OR gate 706. For example, the signal generator 702 is triggered by a rising edge in the demagnetization-detection signal 356. In another example, the signal generators $710_{1 \sim n}$ (e.g., n is an integer) are triggered by a rising edge or a falling edge of the signals $416_1 \sim 416_n$ (e.g., $q_1 \sim q_n$, n is an integer).

Figure 10:
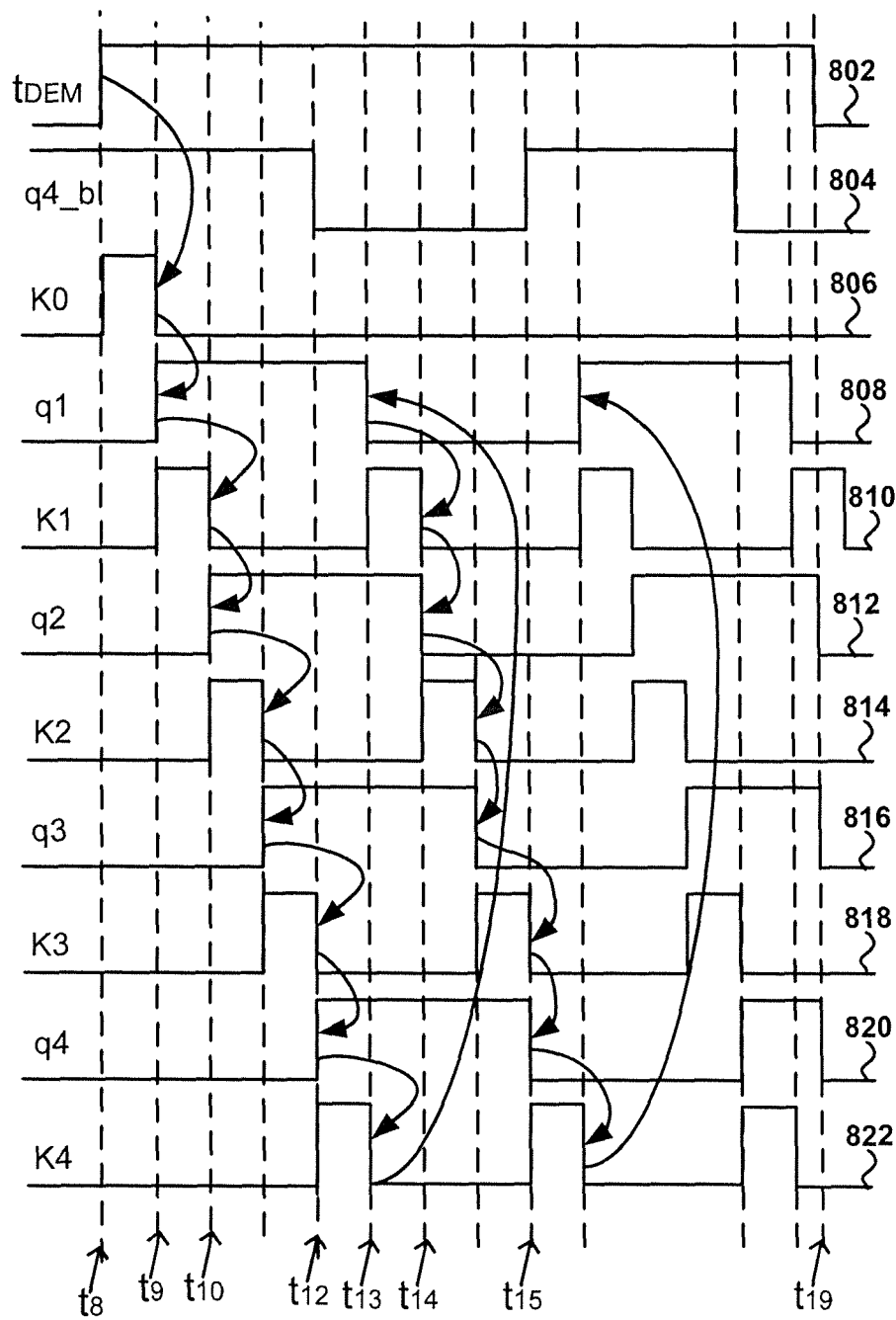
FIG. 10 shows a simplified timing diagram for the counter component as parts of the signal processing component as shown in FIG. 6 according to an embodiment of the present invention.

FIG. 10 shows a simplified timing diagram for the counter component 404 as parts of the signal processing component 304 according to an embodiment of the present invention. This diagram is merely an example, which should not unduly limit the scope of the claims. One of ordinary skill in the art would recognize many variations, alternatives, and modifications. For example, the counter component 404 includes four flip-flop components $708_1 \sim 708_4$. The waveform 802 represents the demagnetization-detection signal 356 as a function of time, the waveform 804 represents a signal 714 (e.g., $q_{4\_b}$) as a function of time, and the waveform 806 represents a signal 716 (e.g., $K_0$) as a function of time. In addition, the waveform 808 represents the signals $416_1$ (e.g., $q_1$) as a function of time, the waveform 810 represents the signal $414_1$ (e.g., $K_1$) as a function of time, the waveform 812 represents the signals $416_2$ (e.g., $q_2$) as a function of time, and the waveform 814 represents the signal $414_2$ (e.g., $K_2$) as a function of time. Further, the waveform 816 represents the signals $416_3$ (e.g., $q_3$) as a function of time, the waveform 818 represents the signal $414_3$ (e.g., $K_3$) as a function of time, the waveform 820 represents the signals $416_4$ (e.g., $q_4$) as a function of time, and the waveform 822 represents the signal $414_4$ (e.g., $K_4$) as a function of time.

As shown in FIG. 7 and FIG. 8, if the demagnetization-detection signal 356 is at a logic low level (e.g., before $t_8$ as shown by the waveform 802), the signals $416_1 \sim 416_n$ (e.g., $q_1 \sim q_n$, n is an integer) are all at the logic low level (e.g., as shown by the waveforms 808, 812, 816 and 820), while a signal 714 (e.g., $g_{n\_b}$)) generated by the NOT gate 712 is at a logic high level (e.g., as shown by the waveform 804). For example, if the demagnetization-detection signal 356 changes from the logic low level to the logic high level (e.g., at the beginning of a demagnetization period), the rising edge in the demagnetization-detection signal 356 (e.g., at $t_8$ as shown by the waveform 802) triggers the signal generator 702 which generates a pulse signal 716 (e.g., $K_0$) with a pulse width (e.g., $T_d$) as shown by the waveform 806. In another example, a falling edge (e.g., at $t_9$) of the pulse signal 716 (e.g., $K_0$) triggers the flip-flop component $708_1$ to change the signal $416_1$ (e.g., $q_1$) from the logic low level to the logic high level (e.g., at $t_9$ as shown by the waveform 808). In yet another example, the rising edge in the signal $416_1$ (e.g., $q_1$) triggers the signal generator $710_1$ to generate a pulse in the signal $414_1$ (e.g., $K_1$) with a pulse width (e.g., $T_d$) as shown by the waveform 810. In yet another example, the falling edge of the pulse (e.g., at $t_{10}$) in the signal $414_1$ (e.g., $K_1$) triggers the flip-flop component $708_2$ to change the signal $416_2$ (e.g., $q_2$) from the logic low level to the logic high level (e.g., at $t_{10}$ as shown by the waveform 812). In yet another example, the rising edge in the signal $416_2$ (e.g., $q_2$) triggers the signal generator $710_2$ to generate a pulse in the signal $414_2$ (e.g., $K_2$) with a pulse width (e.g., $T_d$) as shown by the waveform 814. Then, until the signal $416_n$ (e.g., $q_n$) changes from the logic low level to the logic high level (e.g., at $t_{12}$ as shown by the waveform 820), the rising edge in the signal $416_n$ (e.g., $q_n$) triggers the signal generator $710_n$ to generate a pulse in the signal $414_n$ (e.g., $K_n$) with a pulse width (e.g., $T_d$) as shown by the waveform 822, in some embodiments.

According to another embodiment, if the signal $416_n$, (e.g., $q_n$) is at the logic high level (e.g., between $t_{12}$ and $t_{13}$ as shown by the waveform 820), the signal 714 is at the logic low level (e.g., as shown by the waveform 804). For example, a falling edge of the pulse (e.g., at $t_{13}$) in the signal $414_n$ (e.g., $K_n$) triggers the signal generator $708_1$ to change the signal $416_1$ (e.g., $q_1$) from the logic high level to the logic low level (e.g., at $t_{13}$ as shown by the waveform 808). In another example, the falling edge in the signal $416_1$ (e.g., $q_1$) triggers the signal generator $710_1$ to generate another pulse in the signal $414_1$ (e.g., $K_1$) with a pulse width (e.g., $T_d$) as shown by the waveform 810. In yet another example, the falling edge of the pulse (e.g., at $t_{14}$) in the signal $414_1$ (e.g., $K_1$) triggers the flip-flop component $708_2$ to change the signal $416_2$ (e.g., $q_2$) from the logic high level to the logic low level (e.g., at $t_{14}$ as shown by the waveform 812). In yet another example, the falling edge in the signal $416_2$ (e.g., $q_2$) triggers the signal generator $710_2$ to generate another pulse in the signal $414_2$ (e.g., $K_2$) with a pulse width (e.g., $T_d$) as shown by the waveform 814. Then, until the signal $416_2$ (e.g., $q_n$) changes from the logic high level to the logic low level (e.g., at $t_{15}$ as shown by the waveform 820), the falling edge in the signal $416_n$ (e.g., $q_n$) triggers the signal generator $710_n$ to generate another pulse in the signal $414_n$ (e.g., $K_n$) with a pulse width (e.g., $T_d$) as shown by the waveform 822, in certain embodiments.

The above-described process continues to operate until the demagnetization-detection signal 356 changes to the logic low level which indicates the end of the demagnetization period (e.g., at $t_{19}$ as shown by the waveform 802), according to some embodiments. For example, the signal generator 704 generates a signal 718 to reset (e.g., set to 0) the flip-flop components $708_{1-n}$ after a short delay (e.g., much shorter than $T_d$ in duration). In another example, when the demagnetization-detection signal 356 changes to the logic high level again (e.g., at the beginning of a next demagnetization period), the above-described process starts again.

Figure 11:
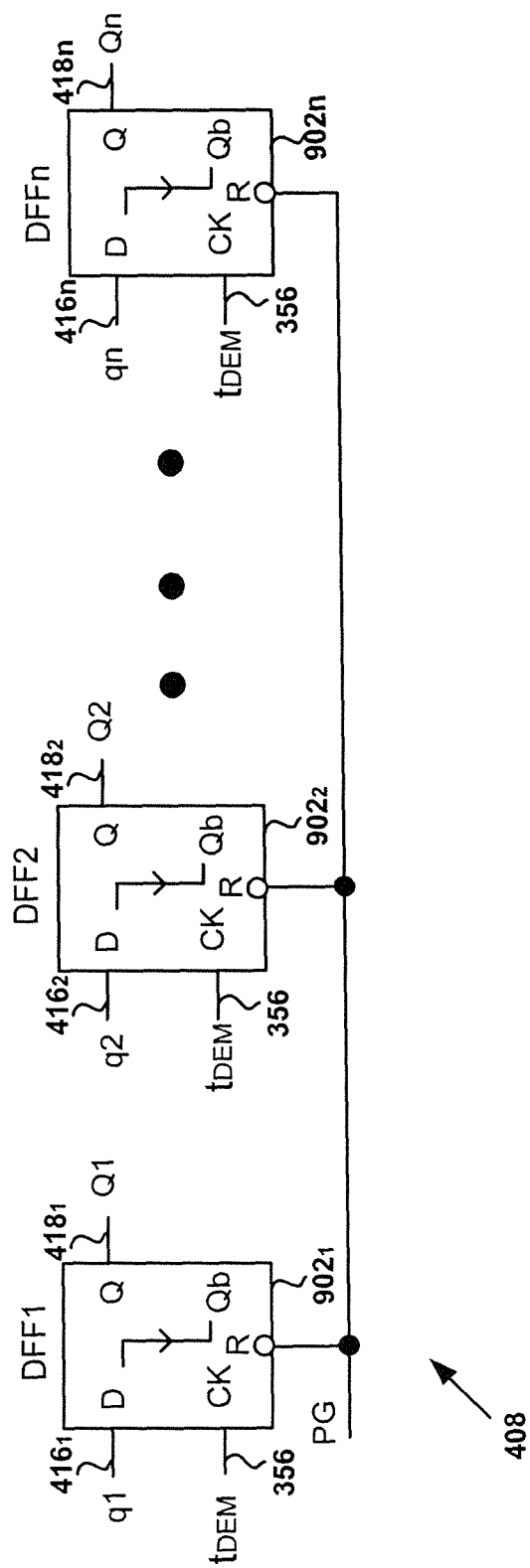
FIG. 11 is a simplified diagram showing the flip-latch component as parts of the signal processing component as shown in FIG. 6 according to an embodiment of the present invention.

FIG. 11 is a simplified diagram showing the flip-latch component 408 as parts of the signal processing component 304 according to an embodiment of the present invention. This diagram is merely an example, which should not unduly limit the scope of the claims. One of ordinary skill in the art would recognize many variations, alternatives, and modifications. The flip-latch component 408 includes flip-flop components $902_1$~$902_n$ (e.g., n is an integer).

According to one embodiment, if the demagnetization-detection signal 356 changes from a logic high level to a logic low level, the falling edge of the demagnetization-detection signal 356 triggers the flip-flop components $902_1$~$902_n$ to sample and hold the signals $416_1$~$416_n$ and outputs the signals $418_1$~$418_n$. For example, referring back to FIG. 4 and FIG. 6, the signals $418_1$~$418_n$ are received by the encoding component 410 for generating the selection signals $420_1$~$420_n$ to select one of the signals $422_1$~$422_n$ to be held on the capacitor 608.

According to another embodiment, the flip-latch component 408 includes four flip-flop components $902_1$~$902_4$. For example, in response to the selection signals $420_1$~$420_n$, the select-and-hold component 406 is to select one of the signals $422_1$~$422_n$ associated with sampling the feedback signal 354 at a particular time. In another example, the select-and-hold component 406 selects one of the signals $422_1$~$422_n$ that is associated with sampling the feedback signal 354 two sampling periods (e.g., $T_d$) before the end of a demagnetization period (e.g., at point C as shown in FIG. 7). A truth table representative of such selection is as follows, in some embodiments.

| $Q_4$ | $Q_3$ | $Q_2$ | $Q_1$ | $S_4$ | $S_3$ | $S_2$ | $S_1$ |
|---|---|---|---|---|---|---|---|
| 0 | 0 | 0 | 0 | 0 | 0 | 1 | 0 |
| 0 | 0 | 0 | 1 | 0 | 1 | 0 | 0 |
| 0 | 0 | 1 | 1 | 1 | 0 | 0 | 0 |
| 0 | 1 | 1 | 1 | 0 | 0 | 0 | 1 |
| 1 | 1 | 1 | 1 | 0 | 0 | 1 | 0 |
| 1 | 1 | 1 | 0 | 0 | 1 | 0 | 0 |
| 1 | 1 | 0 | 0 | 1 | 0 | 0 | 0 |
| 1 | 0 | 0 | 0 | 0 | 0 | 0 | 1 |
| 0 | 0 | 0 | 0 | 0 | 0 | 1 | 0 |

According to another embodiment, a system controller for regulating a power conversion system includes a signal processing component and a driving component. The signal processing component is configured to receive a feedback signal associated with an output signal of a power conversion system and generate a first processed signal based on at least information associated with the feedback signal. The driving component is configured to generate a drive signal based on at least information associated with the first processed signal and output the drive signal to a switch in order to affect a primary current flowing through a primary winding, the drive signal being associated with a demagnetization period corresponding to a demagnetization process of the power conversion system. The signal processing component is further configured to, sample and hold the feedback signal a plurality of times during the demagnetization period to generate a plurality of sampled and held signals, select a signal from the plurality of sampled and held signals, hold the selected signal, and generate the first processed signal based on at least information associated the selected and held signal. For example, the system controller is implemented according to at least FIG. 5, FIG. 6, and/or FIG. 7.

According to yet another embodiment, a signal processing device for regulating a power conversion system includes a sampling and holding component and a selection and holding component. The sampling and holding component is configured to sample and hold a feedback signal a plurality of times during a demagnetization period and generate a plurality of sampled and held signals based on at least information associated with the feedback signal, the feedback signal being associated with an output signal of a power conversion system, the demagnetization period corresponding to a demagnetization process of the power conversion system. The selection and holding component is configured to select a signal from the plurality of sampled and held signals, hold the selected signal, and output a first processed signal based on at least information associated with the selected and held signal for regulating the power conversion system. For example, the system controller is implemented according to FIG. 5, FIG. 6, FIG. 7, FIG. 8, FIG. 9, FIG. 10, and/or FIG. 11.

In one embodiment, a method for regulating a power conversion system includes receiving a feedback signal associated with an output signal of a power conversion system, generating a processed signal based on at least information associated with the feedback signal, and generating a drive signal based on at least information associated with the processed signal. The method further includes outputting the drive signal to a switch in order to affect a primary current flowing through a primary winding, the drive signal being associated with a demagnetization period corresponding to a demagnetization process of the power conversion system. The process for generating a processed signal based on at least information associated with the feedback signal includes, sampling and holding the feedback signal a plurality of times during the demagnetization period to generate a plurality of sampled and held signals, selecting a signal from the plurality of sampled and held signals, holding the selected signal, and generating the processed signal based on at least information associated with the selected and held signal. For example, the method is implemented according to at least FIG. 5, FIG. 6, and/or FIG. 7.

In another embodiment, a method for regulating a power conversion system includes sampling and holding a feedback signal a plurality of times during a demagnetization period, the feedback signal being associated with an output signal of a power conversion system, the demagnetization period corresponding to a demagnetization process of the power conversion system, generating a plurality of sampled and held signals based on at least information associated with the feedback signal, and selecting a signal from the plurality of sampled and held signals. The method further includes holding the selected signal, and outputting a processed signal based on at least information associated with the selected and held signal for regulating the power conversion system. For example, the method is implemented according to FIG. 5, FIG. 6, FIG. 7, FIG. 8, FIG. 9, FIG. 10, and/or FIG. 11.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
    a signal processing component configured to:
        directly receive a feedback signal associated with an output signal of a power conversion system;
        use at least the feedback signal to generate a first processed signal; and
        generate the first processed signal based at least in part on the feedback signal; and
    a driving component configured to generate a drive signal based on at least information associated with the first processed signal and output the drive signal to a switch in order to affect a primary current flowing through a primary winding, the drive signal being associated with at least one switching period related to the switch;
    wherein the signal processing component includes:
        a sampling and holding component configured to:
            sample and hold the feedback signal a plurality of times during a demagnetization period of the switching period, the demagnetization period corresponding to a demagnetization process of the power conversion system; and
            generate a plurality of sampled and held signals based on at least information associated with the feedback signal; and
        a selection and holding component coupled directly to the sampling and holding component and configured to:
            receive the plurality of sampled and held signals directly from the sampling and holding component;
            after the plurality of sampled and held signals are received,
                select a signal from the plurality of sampled and held signals;
                hold the selected signal; and
                generate the first processed signal, the first processed signal being the same as the selected and held signal; and
        a counter component configured to:
            receive a detection signal indicating the demagnetization period; and
            generate a plurality of sampling signals based on at least information associated with the detection signal;
    wherein the sampling and holding component includes:
        a plurality of first switches configured to be closed in response to the plurality of sampling signals respectively in order to sample the feedback signal; and
        a plurality of first capacitors coupled to the plurality of first switches respectively in order to hold the sampled feedback signal;
    wherein the selection and holding component includes:
        a plurality of second switches configured to be closed in response to a plurality of selection signals respectively in order to select the selected signal from the plurality of sampled and held signals; and
        a second capacitor coupled to the plurality of second switches;
    wherein the plurality of second switches includes a plurality of first switch terminals and a plurality of second switch terminals, each switch of the plurality of second switches including a terminal of the plurality of first switch terminals and a terminal of the plurality of second switch terminals;
    wherein:
        the plurality of first capacitors does not include the second capacitor;
        each terminal of the plurality of first switch terminals is directly coupled to one capacitor of the plurality of first capacitors;
        different terminals of the plurality of first switch terminals are directly coupled to different capacitors of the plurality of first capacitors;
        each terminal of the plurality of second switch terminals is directly coupled to the second capacitor; and
        different terminals of the plurality of second switch terminals are directly coupled to the same second capacitor.

2. The system controller of claim 1 wherein the sampling and holding component is further configured to receive the plurality of sampling signals and to sample and hold the feedback signal the plurality of times in response to the plurality of sampling signals respectively.

3. The system controller of claim 1 wherein the counter component is further configured to generate a plurality of counting signals representing the number of signals for the plurality of sampling signals.

4. The system controller of claim 3 wherein the counter component includes:
- a first signal processor configured to receive the detection signal and generate a second processed signal based on at least information associated with the detection signal;
- a plurality of first flip-flop components configured to generate the plurality of counting signals respectively; and
- a plurality of second signal processors configured to receive the plurality of counting signals and generate the plurality of sampling signals respectively.

5. The system controller of claim 3 wherein the signal processing component further includes an encoding component configured to process information associated with the plurality of counting signals and generate a plurality of selection signals based on at least information associated with the plurality of counting signals.

6. The system controller of claim 5 wherein the selection and holding component is configured to receive the plurality of selection signals and select the selected signal from the plurality of sampled and held signals based on at least information associated with the plurality of selection signals.

7. The system controller of claim 6 where the signal processing component further includes a flip-latch component configured to receive the plurality of counting signals and output a plurality of first signals to the encoding component for generating the selection signals.

8. The system controller of claim 7 wherein the flip-latch component includes a plurality of second flip-flop components configured to receive the plurality of counting signals respectively and generate the plurality of first signals.

9. A signal processing device for regulating a power conversion system, the device comprising:
- a sampling and holding component configured to:
  - sample and hold a feedback signal a plurality of times during a demagnetization period of a switching period related to a switch, the demagnetization period corresponding to a demagnetization process of a power conversion system; and
  - generate a plurality of sampled and held signals based on at least information associated with the feedback signal, the feedback signal being associated with an output signal of the power conversion system; and
- a selection and holding component coupled directly to the sampling and holding component and configured to:
  - receive the plurality of sampled and held signals directly from the sampling and holding component;
  - after the plurality of sampled and held signals are received,
    - select a signal from the plurality of sampled and held signals;
    - hold the selected signal; and
    - output a first processed signal, the first processed signal being the same as the selected and held signal;
- wherein the sampling and holding component includes:
  - a plurality of first switches configured to be closed in response to the plurality of sampling signals respectively in order to sample the feedback signal; and
  - a plurality of first capacitors coupled to the plurality of first switches respectively in order to hold the sampled feedback signal;
- wherein the selection and holding component includes:
  - a plurality of second switches configured to be closed in response to a plurality of selection signals respectively in order to select the selected signal from the plurality of sampled and held signals; and
  - a second capacitor coupled to the plurality of second switches;
- wherein the plurality of second switches includes a plurality of first switch terminals and a plurality of second switch terminals, each switch of the plurality of second switches including a terminal of the plurality of first switch terminals and a terminal of the plurality of second switch terminals;
- wherein:
  - the plurality of first capacitors does not include the second capacitor;
  - each terminal of the plurality of first switch terminals is directly coupled to one capacitor of the plurality of first capacitors;
  - different terminals of the plurality of first switch terminals are directly coupled to different capacitors of the plurality of first capacitors;
  - each terminal of the plurality of second switch terminals is directly coupled to the second capacitor; and
  - different terminals of the plurality of second switch terminals are directly coupled to the same second capacitor.

10. The device of claim 9, and further comprising a counter component configured to receive a detection signal indicating the demagnetization period and generate the plurality of sampling signals based on at least information associated with the detection signal.

11. The device of claim 10 wherein the sampling and holding component is further configured to receive the plurality of sampling signals and to sample and hold the feedback signal the plurality of times in response to the plurality of sampling signals respectively.

12. The device of claim 10 wherein the counter component is further configured to generate a plurality of counting signals representing the number of signals for the plurality of sampling signals.

13. The device of claim 12 wherein the counter component includes:
- a first signal processor configured to receive the detection signal and generate a second processed signal based on at least information associated with the detection signal;
- a plurality of first flip-flop components configured to generate the plurality of counting signals respectively; and
- a plurality of second signal processors configured to receive the plurality of counting signals and generate the plurality of sampling signals respectively.

14. The device of claim 12, and further comprising an encoding component configured to process information associated with the plurality of counting signals and generate a plurality of selection signals based on at least information associated with the plurality of counting signals.

15. The device of claim 14 wherein the selection and holding component is configured to receive the plurality of selection signals and select the selected signal from the plurality of sampled and held signals based on at least information associated with the plurality of selection signals.

16. The device of claim 15, and further comprising a flip-latch component configured to receive the plurality of counting signals and output a plurality of first signals to the encoding component for generating the selection signals.

17. The device of claim 16 wherein the flip-latch component includes a plurality of second flip-flop components configured to receive the plurality of counting signals respectively and generate the plurality of first signals.

18. A method for regulating a power conversion system, the method comprising:
directly receiving a feedback signal associated with an output signal of a power conversion system;
using at least the feedback signal to generate a processed signal;
generating the processed signal based at least in part on the feedback signal;
processing information associated with the processed signal;
generating a drive signal based on at least information associated with the processed signal; and
outputting the drive signal to a switch in order to affect a primary current flowing through a primary winding, the drive signal being associated with at least one switching period related to the switch;
wherein the process for generating the processed signal based at least in part on the feedback signal includes:
sampling and holding the feedback signal a plurality of times during a demagnetization period of the switching period, the demagnetization period corresponding to a demagnetization process of the power conversion system;
generating a plurality of sampled and held signals;
holding the plurality of sampled and held signals by a plurality of first capacitors coupled to a plurality of first switches respectively;
directly receiving the plurality of sampled and held signals;
after the directly receiving the plurality of sampled and held signals,
processing information associated with the plurality of sampled and held signals;
selecting a signal from the plurality of sampled and held signals;
holding the selected signal by a second capacitor coupled to a plurality of second switches; and
generating the processed signal, the processed signal being the same as the selected and held signal;
wherein the plurality of second switches includes a plurality of first switch terminals and a plurality of second switch terminals, each switch of the plurality of second switches including a terminal of the plurality of first switch terminals and a terminal of the plurality of second switch terminals;
wherein:
the plurality of first capacitors does not include the second capacitor;
each terminal of the plurality of first switch terminals is directly coupled to one capacitor of the plurality of first capacitors;
different terminals of the plurality of first switch terminals are directly coupled to different capacitors of the plurality of first capacitors;
each terminal of the plurality of second switch terminals is directly coupled to the second capacitor; and
different terminals of the plurality of second switch terminals are directly coupled to the same second capacitor.

19. A method for regulating a power conversion system, the method comprising:
sampling and holding a feedback signal a plurality of times during a demagnetization period of a switching period related to a switch, the feedback signal being associated with an output signal of a power conversion system, the demagnetization period corresponding to a demagnetization process of the power conversion system;
generating a plurality of sampled and held signals based on at least information associated with the feedback signal;
holding the plurality of sampled and held signals by a plurality of first capacitors coupled to a plurality of first switches respectively;
directly receiving the plurality of sampled and held signals;
after the directly receiving the plurality of sampled and held signals,
processing information associated with the plurality of sampled and held signals;
selecting a signal from the plurality of sampled and held signals;
holding the selected signal by a second capacitor coupled to a plurality of second switches; and
outputting a processed signal, the processed signal being the same as the selected and held signal;
wherein the plurality of second switches includes a plurality of first switch terminals and a plurality of second switch terminals, each switch of the plurality of second switches including a terminal of the plurality of first switch terminals and a terminal of the plurality of second switch terminals;
wherein:
the plurality of first capacitors does not include the second capacitor;
each terminal of the plurality of first switch terminals is directly coupled to one capacitor of the plurality of first capacitors;
different terminals of the plurality of first switch terminals are directly coupled to different capacitors of the plurality of first capacitors;
each terminal of the plurality of second switch terminals is directly coupled to the second capacitor; and
different terminals of the plurality of second switch terminals are directly coupled to the same second capacitor.

20. The method of claim 19, and further comprising:
receiving a detection signal indicating the demagnetization period; and
generating a plurality of sampling signals based on at least information associated with the detection signal.

21. The method of claim 20, and further comprising:
receiving the plurality of sampling signals; and
sampling and holding the feedback signal the plurality of times in response to the plurality of sampling signals respectively.

22. The method of claim 21, and further comprising:
generating a plurality of counting signals representing the number of signals for the plurality of sampling signals.

23. The method of claim 22, and further comprising:
processing information associated with the plurality of counting signals; and
generating a plurality of selection signals based on at least information associated with the plurality of counting signals.

24. The method of claim 23, and further comprising:
receiving the plurality of selection signals; and
selecting the selected signal from the plurality of sampled and held signals based on at least information associated with the plurality of selection signals.

* * * * *